(12) United States Patent
Chen et al.

(10) Patent No.: US 9,217,423 B2
(45) Date of Patent: Dec. 22, 2015

(54) ENERGY STORAGE SYSTEM USING SUPERCRITICAL AIR

(75) Inventors: Haisheng Chen, Beijing (CN);
Chunqing Tan, Beijing (CN); Jia Liu, Beijing (CN); Yujie Xu, Beijing (CN)

(73) Assignee: Institute of Engineering Thermophysics, Chinese Academy of Sciences, Beijing (CN)

( * ) Notice: Subject to any disclaimer, the term of this patent is extended or adjusted under 35 U.S.C. 154(b) by 788 days.

(21) Appl. No.: 13/508,019
(22) PCT Filed: Aug. 31, 2010
(86) PCT No.: PCT/CN2010/001325
§ 371 (c)(1),
(2), (4) Date: May 3, 2012
(87) PCT Pub. No.: WO2011/054169
PCT Pub. Date: May 12, 2011

(65) Prior Publication Data
US 2012/0216520 A1    Aug. 30, 2012

(30) Foreign Application Priority Data

Nov. 9, 2009   (CN) .......................... 2009 1 0237029
Nov. 18, 2009  (CN) .......................... 2009 1 0225252

(51) Int. Cl.
*F15B 1/027*    (2006.01)
*F03G 7/06*     (2006.01)
(Continued)

(52) U.S. Cl.
CPC . *F03G 7/06* (2013.01); *F01K 3/004* (2013.01);
*F25J 1/0012* (2013.01); *F25J 1/0037* (2013.01); *F25J 1/0045* (2013.01); *F25J 1/0228* (2013.01); *F25J 1/0251* (2013.01);
*F25J 3/044* (2013.01); *F25J 3/04018* (2013.01); *F25J 3/04054* (2013.01); *F25J 3/04084* (2013.01); *F25J 3/04187* (2013.01); *F25J 3/04193* (2013.01); *F25J 3/04309* (2013.01);
(Continued)

(58) Field of Classification Search
CPC ................................. F15B 1/027; Y02E 60/15
See application file for complete search history.

(56) References Cited

U.S. PATENT DOCUMENTS

2007/0182160 A1*  8/2007  Enis et al. ........................ 290/54
2009/0293502 A1* 12/2009  Vandor ........................... 62/45.1

FOREIGN PATENT DOCUMENTS

CN    1286516 A    3/2001
CN    1308708 A    8/2001
(Continued)

OTHER PUBLICATIONS

Office Action of the SIPO in application No. 200910225252.3 dated Mar. 5, 2012.
(Continued)

*Primary Examiner* — F. Daniel Lopez
(74) *Attorney, Agent, or Firm* — Kinney & Lange, P.A.

(57) ABSTRACT

Disclosed is an energy storage system using supercritical air, comprising a compressor unit, a heat exchanger and storage device, a cold exchanger and storage device, a cryogenic tank, a throttling valve, at least one cryogenic pump, an expander unit, a generator, and a driver unit. There are several advantages of this invention, including high energy density, high efficiency, no storage cycle and geographical conditions restriction, easy implementation with all kinds of power stations, environment friendliness and capability of recycling low to medium temperature waste heat and so on.

22 Claims, 4 Drawing Sheets

(51) Int. Cl.
*F01K 3/00* (2006.01)
*F25J 3/04* (2006.01)
*F25J 1/00* (2006.01)
*F25J 1/02* (2006.01)

(52) U.S. Cl.
CPC ......... *F25J 3/04581* (2013.01); *F25J 3/04842* (2013.01); *F25J 2205/24* (2013.01); *F25J 2230/04* (2013.01); *F25J 2230/08* (2013.01); *F25J 2230/30* (2013.01); *F25J 2240/10* (2013.01); *F25J 2240/90* (2013.01); *F25J 2245/90* (2013.01); *Y02E 60/15* (2013.01)

(56) References Cited

FOREIGN PATENT DOCUMENTS

| CN | 1482349 | A | 3/2004 |
|---|---|---|---|
| CN | 100999999 | A | 7/2007 |
| CN | 101289963 | A | 10/2008 |
| JP | 03156175 | A | 7/1991 |
| WO | 0001934 | A1 | 1/2000 |
| WO | 2005056994 | A1 | 6/2005 |
| WO | 2008061454 | A1 | 5/2008 |

OTHER PUBLICATIONS

Office Action of the SIPO in application No. 200910225252.3 dated Jan. 17, 2013.
International Search Report of State Intellectual Property Office of P.R. China in International Application No. PCT/CN1010/001325, dated Dec. 9, 2010.
International Written Opinion of State Intellectual Property Office of P.R. China in International Application No. PCT/CN1010/001325, dated Dec. 9, 2010.
English Translation of Office Action dated Jun. 21, 2013 for JP 2012-537281.
English Translation of Office Action dated Aug. 2, 2013 for CN 200910225252.3.
Office Action dated Jun. 4, 2014, for corresponding European Patent Application No. 10827783.1.

* cited by examiner

ENERGY STORAGE SYSTEM USING SUPERCRITICAL AIR

TECHNICAL FIELD

The present invention in general relates to energy storage, and in particular, to an electrical energy storage system using supercritical air.

BACKGROUND

Electrical energy storage systems (EES) are urgently needed by the conventional electricity generation industry. Unlike any other successful commodities markets, the conventional electricity generation industries have little or no storage component. The electricity transmission and distribution systems are operated for the simple one-way transportation from remote and large power plants to consumers. This means that electricity should always be consumed precisely as it is produced. However, the demand for electricity varies considerably emergently, daily and seasonally, and the maximum demand may only last for a few hours each year which leads to inefficient, over-designed and expensive plants. EES allows energy production to be de-coupled from its supply, self generated or purchased. By having large-scale electricity storage capacity available over any time, system planners would need to build only sufficient generating capacity to meet average electrical demand rather than peak demands. This is particularly more important to large utility generation systems, e.g. nuclear power plants, which must operate near full capacity for economic reasons. Therefore, EES can provide substantial benefits including load following, peaking power and standby reserve. Also by providing spinning reserve and a dispatched load, EES can increase the net efficiency of thermal power sources while reducing harmful emissions.

More importantly, EES systems are critically important to intermittent renewable energy supply systems, such as solar photovoltaic, wind turbine and wave power systems. The penetration of renewable resources may displace significant amounts of energy produced by large conventional plant. However, intermittency and non-controllability are inherent characteristics of renewable energy based electricity generation systems, which renders energy supply unstable, even unusable. Such disadvantages have become major hurdles or obstacles to the extensive utility of the renewable energy sources, the green electricity industry. A suitable EES could obviously provide an essential solution to deal with the intermittency of renewable sources and the unpredictability of their output as the surplus could be stored during the periods when intermittent generation exceeds the demand and then be used to cover periods when the load is greater than the generation.

Furthermore, EES is regarded as an imperative technology for the distributed energy resource system (DER) in the near future. Different from the conventional power system which has large, centralized units, DERs are usually installed at the distribution level, close to the places of utilisation, and generate power typically in the small range of a few kW to a few MW. DER is regarded as a sustainable, efficient, reliable and environmentally friendly alternative to the conventional energy system. The energy resource system is undergoing the change to be a mixture of centralized and distributed sub-systems with higher and higher penetration of DERs. However, more drastic load fluctuation and emergent voltage drop are anticipated in DER systems due to smaller capacity and higher possibility of line fault than the conventional power system. EES is identified as a key solution to compensate the power flexibility and provide uninterruptible power supply in case of instantaneous voltage drop for such distributed energy network.

Currently, electrical energy storage technology includes Pumped Hydro, Compressed Air Energy Storage, Secondary Battery, Superconducting Magnetic Energy Storage System, Flywheel, Capacitor and so on. However, only Pumped Hydro and Compressed Air Energy Storage have been commercially utilized currently in a large scale, in consideration of capacity, energy storage duration, energy density, charge-discharge efficiency, life time, operating cost and environmental effects.

Pumped Hydro method pumps water from a lower level reservoir to a higher level converting electrical energy into potential energy during off-peak time, and later the stored water in high level is released through hydro turbine to generate power during periods at high electrical demand. Pumped Hydro is the most widely used electrical energy storage system with advantages of mature technique, high efficiency (70%), large capacity and unlimited energy storage period. However, pumped hydro is under many restrictions for its requiring special geographical conditions to build two reservoirs and dams, its long construction period, huge initial investment, and, what is more important, it gives rise to ecological and immigration problems resulted from the rising water flooding vegetation, even city, owing to the construction of reservoir.

Traditional compressed air energy storage is based on the gas turbine technology. Air is compressed into air-storage vessel with electrical energy converting to potential energy during periods of low power demand (off-peak), and later high pressure air is released, heated by combustor, and expanded through turbine to produce electricity. Compressed-air energy storage system has several advantages: high energy storage capacity, long energy storage period, high efficiency (50%-70%) and comparatively low unit cost. Traditional compressed-air energy storage system, which cannot be used alone, has to be combined only with gas turbine power plant, rather than other types, such as coal-fired power plant, nuclear power plant, wind power plant or solar power plant. As a result, it is not appropriate for the energy strategy of China, which advocates coal-fired power plant rather than oil or gas fired power plant. Furthermore, compressed-air energy storage system still depends on fossil fuel, which not only contaminates the environment with emission of $SO_x$, $NO_x$ and carbon dioxide, but also faces the pressure from exhaustion of fossil fuel and increasing price of fossil-based fuel. The most important problem is that large-scale air-storage vessel built for its low energy density requires strict geographical condition, such as rock caves, salt mines and abandoned mines, limiting the range of application of compressed-air energy storage system.

In recent years, much research has been carried out on Compressed-air Energy Storage (CAES), such as Surface Vessel Compressed-air Energy Storage (SVCAES), Advanced Adiabatic Compressed-air Energy Storage (AA-CAES) and Compressed air storage with humidification (CASH), for eliminating the dependence of CAES on fossil fuel, one of the major problems of CAES. However, the energy density of CAES becomes lower because of nonuse of fossil fuel. It is necessary to find a method to overcome the low energy density and difficult siting of CAES so as to bring out a widely effective use of CAES.

SUMMARY OF THE INVENTION

The present invention has been made to overcome or alleviate at least one aspect of the above problems or disadvantages.

The purpose of this invention is to provide an electrical energy storage system using supercritical air. In consideration of the particular characteristics of the super-critical air, the present invention has been made to solve the major problem of CAES system, and the novel energy storage system is suitable for various types of power stations.

According to an aspect of the present invention, there is provided an electrical energy storage system using supercritical air, comprising: a compressor unit, a heat exchanger/storage device, a cold exchanger/storage device, a throttling valve, a cryogenic tank, a valve, a cryogenic pump, an expander unit, a generator, a drive unit and a plurality of pipes; wherein the compressor unit includes at least one low-pressure compressor and at least one high-pressure compressor, the compressors being connected in series or integrated into a multistage compressor, an inlet of each of the low-pressure compressors being connected to an air intake duct;

the expander unit includes at least one low-pressure expander and at least one high-pressure expander, the expanders being connected in series or integrated into a multistage expander, an outlet of the low-pressure expanders being connected to an air outlet duct;

a driving shaft of the drive unit is coupled to a driven shaft of the compressor unit, and a driven shaft of the generator is coupled to a driving shaft of the expander unit;

the low-pressure compressors and the high-pressure compressors are connected to the heat exchanger and storage device via the pipes (13) and (14,15) respectively;

the heat exchanger and storage device (2), the cold exchanger and storage device and the cryogenic tank are connected by pipes (16,17,18,19,30) in sequence;

the throttling valve is provided in the pipe (30), the valve and the at least one cryogenic pump are arranged in the pipe (31) with the valve upstream to the cryogenic pump in the flow direction of the air fluid;

the heat exchanger and storage device (2) is connected to the low-pressure expanders and the high-pressure expanders by the pipes (20, 21, 22) respectively;

an exhaust pipe (24) for discharging slag is provide at bottom of the cold exchanger and storage device.

The whole process is described as following:

When storing energy, the compressor unit consisting of the low-pressure compressors and high-pressure compressors, driven by the drive unit, compresses air to a supercritical state. At the same time, the compression heat is stored in the heat exchanger and storage device (2); supercritical air enters the cold exchanger and storage device where it is cooled down to a temperature low enough, then passes through a throttling valve to produce a wet vapor stream, in which liquid air is in a vast majority and is then stored in the cryogenic tank. When recovering energy, liquid air is pumped into the cold exchanger and storage device where it is heated at a constant pressure and becomes a supercritical fluid. At the same time, cold energy is recovered, then the supercritical air from the cold exchanger and storage device passes through the heat exchanger and storage device (2) for further increasing the temperature, and then expands through an expander unit consisting of low-pressure and high-pressure expanders, to drive an electrical generator.

According to the above-mentioned energy storage system using supercritical air, the drive unit is a motor; electricity used to drive the motor is produced by one or more of the following utilities: fossil fuelled power station, nuclear power station, and wind, solar, hydroelectric, tidal power stations.

According to the above-mentioned energy storage system using supercritical air, the storage phase of operation occurs during periods of low energy demand, excessive renewable energy supply and low quality renewable energy production; and the recovery phase of operation occurs during periods of high energy demand, electrical accident and wide fluctuations of renewable energy output.

According to the above-mentioned energy storage system using supercritical air, the heat exchanger/storage device (2) includes a transfer pipe (23) connected with external heat source.

According to the above-mentioned energy storage system using supercritical air, the compressing and cooling processes further comprise air cleaning and purification for removing solid and gaseous impurities from air; air cleaning and purification units, which is not shown alone, are integrated in the compressor unit and the cold exchanger and storage device.

According to the above-mentioned energy storage system using supercritical air, if the small amount of carbon dioxide, water vapor and argon that need to be removed from air is very small, the air cleaning and purification units may be a filter.

According to the above-mentioned energy storage system using supercritical air, the overall compression ratio of the compressor unit is between 38 and 340; when the compressor unit consists of multiple compressors, the compressors are mounted on a single shaft in series or on several shafts in parallel; when compressors are connected in parallel, the driving shafts and the driven shafts are connected by a removable connection; the compressed air discharged from each stage of the compressor unit flows through the heat exchanger/storage device (2).

According to the above-mentioned energy storage system using supercritical air, the overall expansion ratio of the expander unit is between 38 and 340, and the discharge pressure of the final-stage expander is close to the atmospheric pressure; when the expander unit consists of multiple expanders, expanders are mounted on a single shaft in series or on several shafts in parallel; when expanders are connected in parallel, the driving shafts and driven shafts are connected by a removable connection; the intake air of each stage of the expander unit flows through heat exchanger and storage device (2) for inter-heating.

According to the above-mentioned energy storage system using supercritical air, the types of compressors in compressor unit may be: reciprocating, axial, centrifugal, screw or mixed.

According to the above-mentioned energy storage system using supercritical air, the types of expanders in expander unit may be: reciprocating, axial, centripetal, screw or mixed.

According to the above-mentioned energy storage system using supercritical air, when the compressor unit or the expander unit consists of a plurality of compressors or a plurality of expanders respectively, they are mounted on a single or several shafts According to the above-mentioned energy storage system using supercritical air, an intake air flow rate of compressor unit is larger than that of the supercritical air, wherein the excess air flow rate is less than 10% of that of the supercritical air.

According to the above-mentioned energy storage system using supercritical air, the system further comprises: a further heat exchanger/storage device (25), which is combined with a solar collectors by pipes (26,27) so as to form a thermal energy conversation circuit.

Pipes (20, 21, 22) link the heat exchanger/storage device (2) and (25), the low-pressure expanders and the high-pressure expanders to form a working circuit.

The process can be described as follows:

Supercritical air from the heat exchanger/storage device (2) firstly passes through the further heat exchanger/storage device (25) and is heated to a high temperature, and then flows through the pipe (20) and expands through the high-pressure expander to produce work. And again, air from the high-pressure expander is heated by passing through the pipe (21), the heat exchanger/storage device (2), the further heat exchanger/storage device (25) and the pipe (22) in sequence, and then expands through the low-pressure expander to deliver work.

According to the above-mentioned energy storage system using supercritical air, heat stored in the heat exchanger/storage device is in one or more forms of sensible heat, latent heat or chemical energy.

Heat storage media includes water, paraffin, bio-oil, inorganic crystalline hydrated salts, molten salt, metals and their alloys, organic fatty acids, stone, rock or concrete and so on, which are stored in well-insulated storage containers.

The heat exchanger/storage device (2) absorbs and stores compression heat when the energy is stored and uses the heat to raise the temperature of intake air of each stage of the expander unit when the energy is recovered.

Waste heat is added to heat exchanger and storage device (2) via the transfer pipe (23) at any time during energy recovering or releasing.

According to the above-mentioned energy storage system using supercritical air, supercritical air is cooled to a temperature between 81 K and 150 K through the cold exchanger/storage device in which cold energy storage is in one or two forms of sensible heat and solid-liquid phase change latent heat.

Sensible cold storage medium may comprise one or more selected from the following: sealed ice ball, sand, gravel, aluminum strip or other metals; the solid-liquid phase change cold storage medium may include one or more selected from the following: ammonia, aqueous ammonia, salts water solutions, alkane, olefin and their compounds, alcohols and their water solutions, with their solid-liquid phase transition temperatures being in the range of 81K to 273K, wherein the cold storage medium is stored in well-insulated storage containers.

In the cold exchanger and storage device, supercritical air or liquid air exchanges heat directly or indirectly with the cold storage medium.

Supercritical air is cooled in the cold exchanger and storage device when the energy is stored, and cold energy produced in the high-pressure liquid air gasification process is stored in the cold exchanger and storage device when energy is recovered.

According to the above-mentioned energy storage system using supercritical air, when the cold exchanger and storage device does not provide enough cold energy, the turbo-expander or throttling valve is added to produce additional cold; after passing through the throttling valve, the cooled air is converted from a fluid state into a wet vapor state where the saturated liquid air is the major component, and the remaining saturated vapor is routed back into the cold exchanger and storage device for the purpose of providing cold energy compensation.

According to the above-mentioned energy storage system using supercritical air, the cryogenic pump may be: reciprocating, centrifugal or mixed, in which liquid air is pumped up to a pressure in the range of 3.8 MPa to 34 MPa; the cryogenic pump may include a plurality of pumps, and they are arranged either in series or in parallel.

According to the above-mentioned energy storage system using supercritical air, when air separation products is produced, an air separation and distillation equipment with a pipe (29) in its bottom side is installed between the cold exchanger and storage device and the cryogenic tank, and they are connected by pipes (32, 33).

The process of the system is described as follows:

The cooled air flow from the cold exchanger and storage device flows into the air separation and distillation equipment to produce air products, the resulted gaseous products are withdrawn through pipe (29), and the refined liquid products are delivered through pipe (33) and then stored in cryogenic tanks.

According to the above-mentioned energy storage system using supercritical air, when the air discharged from the low-pressure expander is used for air conditioning and refrigeration, the inlet temperature and expansion ratio of the low-pressure expander are controlled to adjust the exit-side air B temperature.

According to the above-mentioned energy storage system using supercritical air, the step of adjusting intake air mass flow rate includes at least one of the following: varying compressor load, starting and stopping some compressors and adjusting the compression ratio.

According to the above-mentioned energy storage system using supercritical air, waste heat or solar heat is stored in the heat exchanger and storage device (2, 25) and used for heating the intake supercritical air of each stage of the expander unit.

According to the above-mentioned energy storage system using supercritical air, waste heat comes from power plant, cement industry, iron and steel industry or chemical industry. Waste heat is stored in the heat exchanger and storage device (2) and solar heat energy is stored in the further heat exchanger and storage device (25).

There are several advantages of this invention, including high energy density, high efficiency, no need for big storage vessel and special geographical conditions, suitability for all kinds of power stations, environment friendliness, capability of recycling low to medium temperature waste heat and long cycle life time.

DETAILED DESCRIPTION OF PREFERRED EMBODIMENTS OF THE INVENTION

Figure 1:
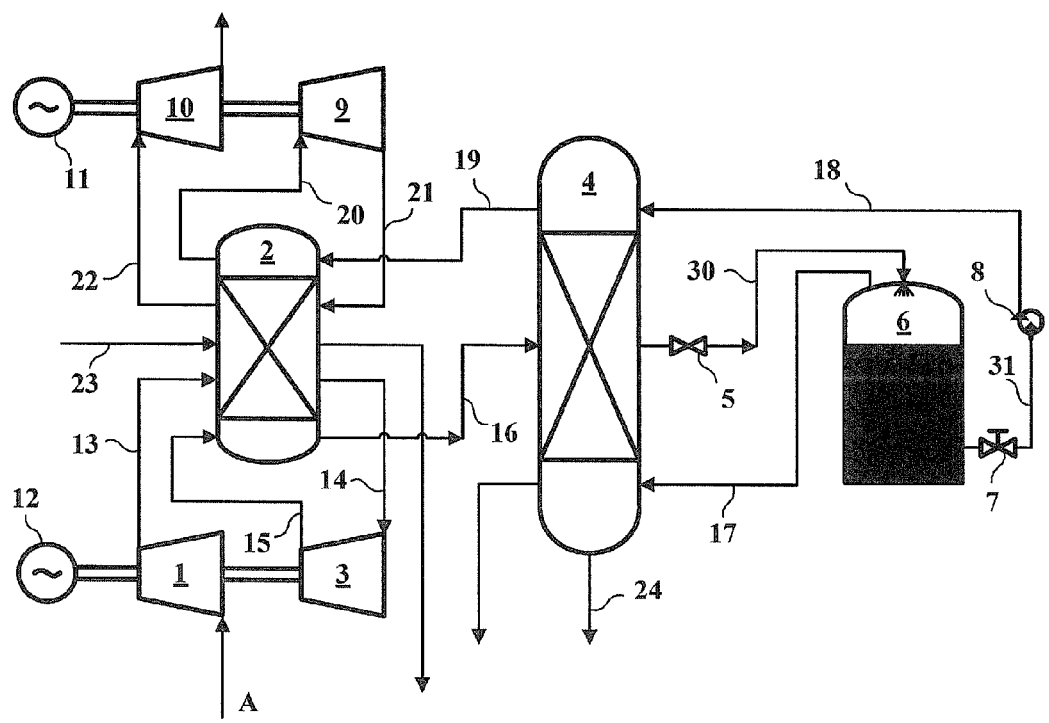
FIG. 1 is a schematic view of a first embodiment of the energy storage system using supercritical air.

Energy storage system using supercritical air according to this invention runs compressors by use of low-cost off-peak electricity to pressurize air to supercritical state (at the same time, compression heat is recovered), and then cools the supercritical air by the cold energy stored in a heat exchanger and storage device, and finally liquefies the supercritical air (energy storage). During peak time, the liquid air is pumped into the heat exchanger/storage device where the supercritical air is heated at constant pressure and becomes a supercritical fluid (at the same time, cold energy is recycled and stored), after absorbing the stored compression heat, the supercritical air expands through a turbine to generate power (energy recovery). It should be noted that waste heat from plants can be recycled to promote the efficiency of system. Due to the particular characteristics of the supercritical air, this system has the following advantages:

High energy density: the supercritical air and liquid air have much higher density than gaseous air (for example, the density of liquid air is about 800 times higher than that of gaseous air at the normal pressure). Under the same conditions, the energy density of energy storage system using supercritical air is one order of magnitude higher than that of CAES and two orders of magnitude higher than that of pumped hydro energy storage system.

No need for big storage vessel: due to the high energy density, the volume of air tank is much smaller than that in the conventional CAES. So the investment can be cut down and construction period is shortened. Particularly, this present system does not rely on geographical conditions, which overcomes the major disadvantage of the conventional CAES.

High efficiency: due to the use of the necessary heat exchanger and storage device and cold exchanger/storage device, the efficiency of the system is estimated as 65-70%, which is higher than that of the conventional CAES.

Flexibility of storage duration: currently, the conventional industrial low-temperature vacuum storage tank, Dewar flask, can chronically preserve liquid air on a large scale, and its daily loss rate is smaller than 0.005.

Easy application with all kinds of power stations: the energy storage system only exchanges electricity with power stations by use of the supercritical gas, and does not interrupt their internal processes of power stations.

Environment friendliness: the present energy storage system does not involve the burning of fossil fuels, therefore it does not produce any harmful emissions. Furthermore, $SO_x$, $NO_x$ and carbon dioxide and other harmful substances can be easily extracted during the cooling process of supercritical air, thus contributing to improve quality of the atmosphere.

Waste heat recovery: the present air energy storage system could be combined with other industrial plants, such as the cement plants, iron and steel metallurgical plants and chemical plants, so as to efficiently recover heat or store heat energy.

FIG. 1 shows a first embodiment of the energy storage system using supercritical air. The system includes a low-pressure compressor 1, a heat exchanger and storage device 2, a high-pressure compressor 3, a cold exchanger and storage device 4, a throttling valve 5, a cryogenic tank 6, a valve 7, a cryogenic pump 8, a high pressure expander 9, a low-pressure expander 10, a generator 11, a drive unit 12 and air A. The system may further comprise a plurality of pipes, such as those denoted by 13, 14, 15, 16, 17, 18, 19, 20, 21, 22, 23, 24, 30 and 31.

In this example, the drive unit 12 is connected with the compressors 1 and 3 by a common transmission shaft, and the generator 11 is connected with the expanders 9 and 10 by a common transmission shaft. The low-pressure compressor 1 and high-pressure compressor 3 are connected to the heat exchanger and storage device 2 by the pipes 13 and 14, 15, respectively. The air A flows into the system at an inlet of low-pressure compressor 1. The heat exchanger and storage device 2, the cold exchanger and storage device 4 and the cryogenic tank 6 are connected in sequence by pipes 16, 17, 18, 19, 30. The pipe 30 is provided with a throttling valve 5, and the pipe 31 is provided with a cryogenic pump 8 and the valve 7 which is located upstream to the cryogenic pump 8 along the direction of air flow. The heat exchanger and storage device 2 is connected to a low-pressure expander and a high-pressure expander by the pipes 20, 21 and 22, respectively. The gas exhausted from the low pressure expander 10 is released into the atmosphere.

The heat exchanger and storage device 2 includes a transfer pipe 23 connected with an external heat source. At bottom of the cold exchanger and storage device 4, there is provided an exhaust pipe 24 allowing slag to flow out.

When energy is stored, the low-cost off-peak electricity is used to power the drive motor 12, which in turn drives the compressor unit. The cleaned (not shown in FIG. 1) atmosphere air A is firstly introduced and compressed by the low-pressure compressor 1, and then flows into the heat exchanger/storage device 2 via the pipe 13, in which the pressured air exchanges heat with the thermal storage media so as to store compression heat in the heat exchanger/storage device 2. The cooled air is then led to the high-pressure compressor 3 via the pipe 14 and compressed to supercritical state therein, and then flows into the heat exchanger and storage device 2, in which the compression heat is again stored. The supercritical air cooled to a certain temperature is directed through the pipe 16 and further cooled to a low-temperature in the cold exchanger and storage device 4 by a cold storage medium. Finally, the low-temperature and high-pressure air from the cold exchanger and storage device 4 is throttled through the throttling valve 5, where the vast majority of air stream is liquefied. The liquefied air is then flowed and stored in cryogenic tank 6, where the rest saturated vapor then returns to the cold exchanger and storage device 4 via the pipe 17.

When energy is recovered, the valve 7 is opened and the liquid air from the cryogenic tank 6 is pumped to a certain pressure by the cryogenic pump 8. The working fluid then flows into the cold exchanger and storage device 4 via the pipe 18. In the cold exchanger and storage device 4, the liquid air is gasified by exchanging heat with the cold storage medium therein, and meanwhile the cold energy is stored. The supercritical air flowing out from the cold exchanger/storage device 4 enters the heat exchanger and storage device 2 via the pipe 19 and is further heated therein. The heated supercritical air then flows into the high-pressure expander 9 and produces work there. The resulted gas from the high-pressure expander 9 passes through the pipe 21, the heat exchanger and storage device 2 and the pipe 22 in sequence and is heated again. It then expands in the low-pressure expander 10 to deliver work.

Generally, the processes of energy storing and energy releasing do not operate simultaneously. During energy storing, the compressors work while the expanders and the cryogenic pump 8 are shut down and the valve 7 is closed, the heat exchanger and storage device 2 recovers and stores compression heat so as to cool down the air. At the same time, the cold exchanger and storage device 4 cools down the supercritical air to low temperature. In a reverse manner, during energy releasing, the valve 7 is kept open and the expanders and the cryogenic pump 8 work and the cold exchanger and storage device 4 recovers and stores the cold energy from the expanding process while the compressors are shut down. At the same time, high pressure liquid air is heated up to a supercritical temperature state, which is further heated up by the recovered compression heat in the heat exchanger and storage device 2.

In addition, external heat can be introduced into the heat exchanger and storage device 2 via the pipe 23. The impurities and pollutants dissociated in the process can be discharged through the exhaust pipe 24 when the supercritical air is introduced into the cold exchanger and storage device 4 and cooled therein.

Figure 2:
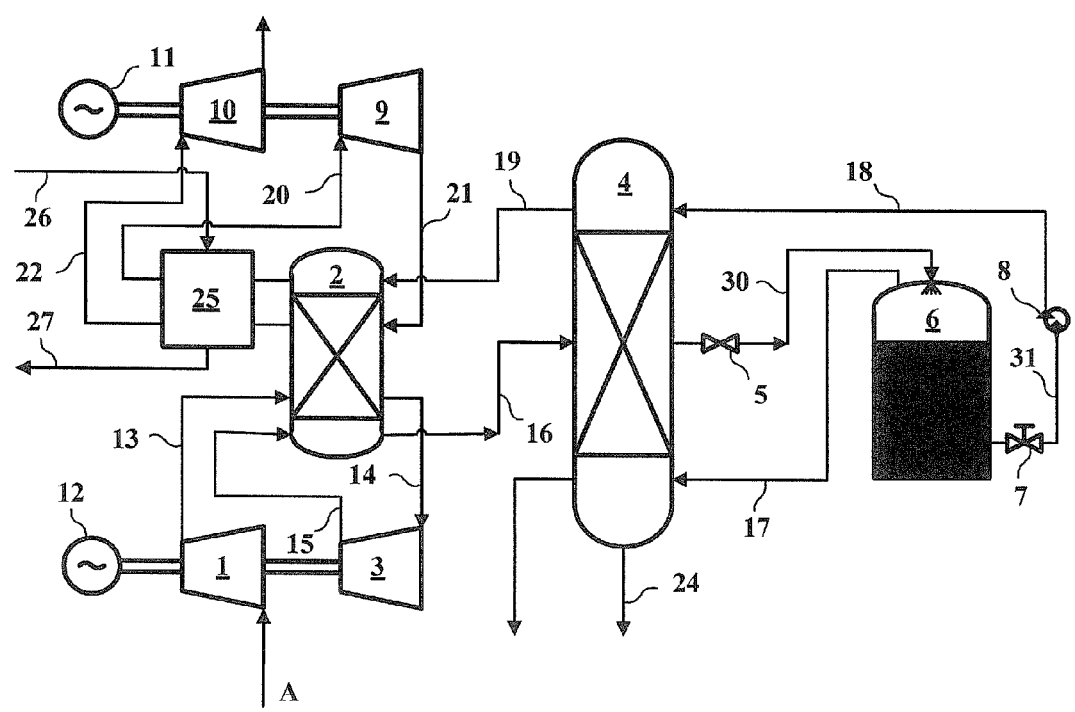
FIG. 2 is a schematic view of a second embodiment of the energy storage system using supercritical air.

FIG. 2 shows a second embodiment of the combination of the energy storage system using supercritical air with a solar thermal power generation according to the present application. This embodiment is same with the first embodiment, but with the connection part for the solar collectors. According to the second embodiment, it includes a low-pressure compressor 1, a heat exchanger and storage device 2, a high-pressure compressor 3, a cold exchanger and storage device 4, a throttling valve 5, a cryogenic tank 6, a valve 7, a cryogenic pump 8, a high-pressure expander 9, a low-pressure expander 10, a generator 11, a drive motor 12, a further high-temperature heat exchanger and storage device 25 and air A. It is further provided with pipes 13, 14, 15, 16, 17, 18, 19, 20, 21, 22, 24, 26, 27, 30 and 31.

High-temperature fluid coming from the solar collector flows into the high-temperature heat exchanger and storage device 25 via the pipe 26, releases its heat and then flows back to solar collector to complete a circuit. Meanwhile the supercritical air from the heat exchanger and storage device 2 is superheated to a high temperature by flowing through the high-temperature heat exchanger and storage device 25. Then the superheated air goes into the high-pressure expander 9 to produce work via the pipe 20. The outlet air from the high-pressure expander 9 goes through the pipe 21, the heat exchanger and storage device 2, the high-temperature heat exchanger and storage device 25 and the pipe 22 in sequence for an inter-heating, then flows into low-pressure expander 10 to deliver work.

Figure 3:
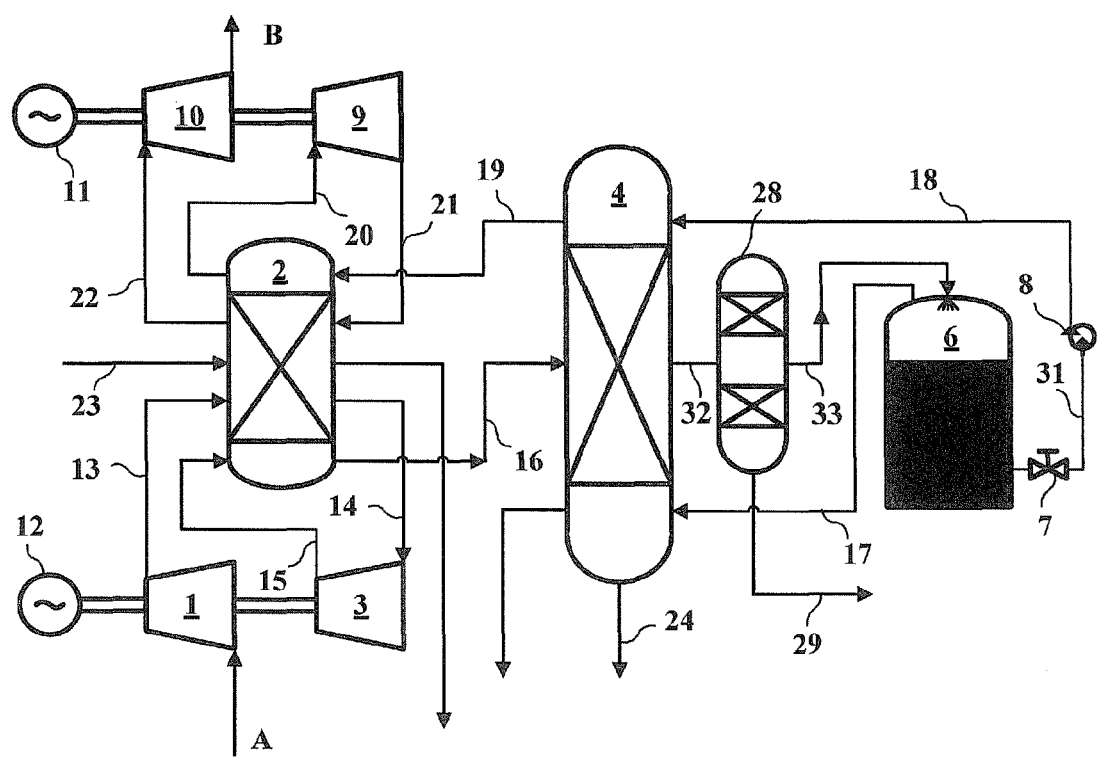
FIG. 3 is a schematic view of a third embodiment of the energy storage system using supercritical air.

FIG. 3 is an improved third embodiment with respect to FIG. 1, which is same with the first embodiment, but with the additional air separation and distillation equipment (in which the valve 5 is integrated). According to the third embodiment, it includes a low-pressure compressor 1, a heat exchanger and storage device 2, a high-pressure compressor 3, a cold exchanger and storage device 4, a cryogenic tank 6, a valve 7, a cryogenic pump 8, a high-pressure expander 9, a low-pressure expander 10, a generator 11, a drive motor 12, an air separation equipment 28, air A and outlet air B. It also includes pipes 13, 14, 15, 16, 17, 18, 19, 20, 21, 22, 23, 24, 29, 31, 32 and 33.

The low-temperature fluid flows into the air separation equipment 28 after it has been cooled down to a certain temperature in the cold exchanger and storage device 4. The air separation products, such as Oxygen ($O_2$), Argon (Ar) and so on, are withdrawn through pipe 29, and the refined nitrogen is introduced into cryogenic tank 6 via the pipe 33. In addition, the temperature of air B at the outlet of the low-pressure expander 10 can be controlled by adjusting the inlet temperature and the expansion ratio of the low-pressure expander 10. As a result, the air B can be used for different purposes, such as air conditioning and refrigeration.

Figure 4:
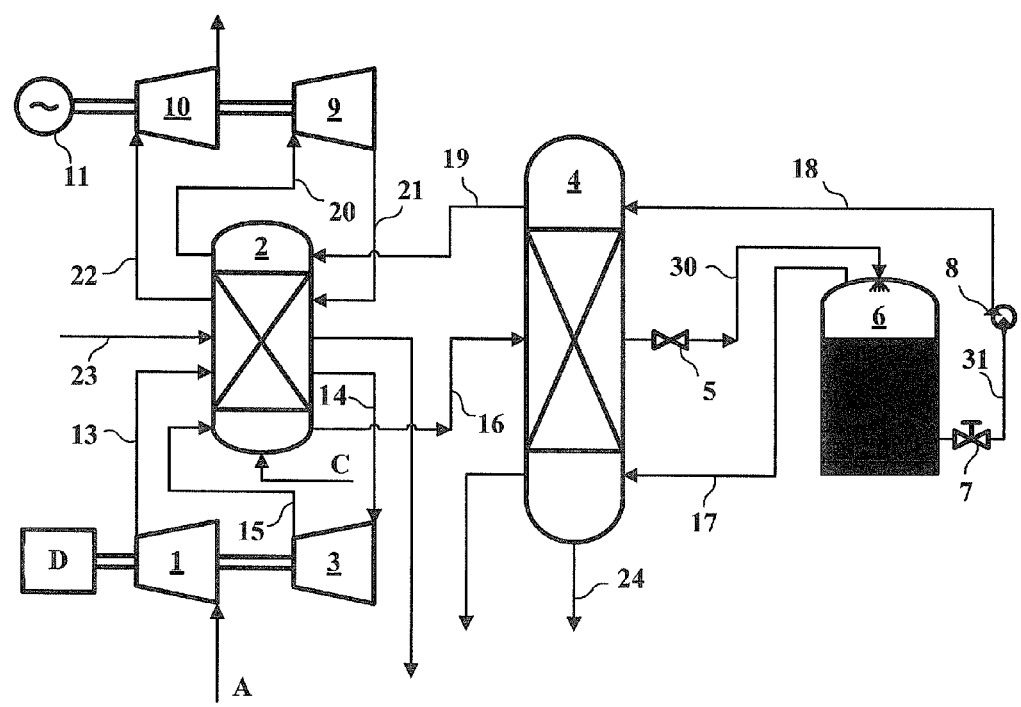
FIG. 4 is a schematic view of a fourth embodiment of the energy storage system using supercritical air.

FIG. 4 shows an improved fourth embodiment of the combination of the energy storage system using supercritical air with a wind farm according to the present application, which is substantially same with the first embodiment, but without the drive motor. According to the fourth embodiment, it includes a low-pressure compressor 1, a heat exchanger and storage device 2, a high-pressure compressor 3, a cold exchanger and storage device 4, a throttling valve 5, a cryogenic tank 6, a valve 7, a cryogenic pump 8, a high-pressure expander 9, a low-pressure expander 10, a generator 11, air A, a low-cost off-peak electricity C and a compression work D. It also includes pipes 13, 14, 15, 16, 17, 18, 19, 20, 21, 22, 23, 24, 30 and 31.

In the fourth embodiment, the wind energy is directly used to drive the compressors and is not needed to be converted into electricity. The different streams of compressed air are transferred to the heat exchanger and storage device 2 via pipes respectively so as to store compression heat therein. As the compression occurs in different stages and different places, a portion of the compression heat is dissipated during the transferring of supercritical air. External heat resource, such as waste heat and residual heat, can be added into the energy storage system via pipe 2 or additional heat can be added to the heat exchanger and storage device 2 through heating by use of off-peak electricity C.

The invention claimed is:

1. An energy storage system using supercritical air, comprising a compressor unit, a heat exchanger and storage device, a cold exchanger and storage device, a cryogenic tank, a throttling valve, at least one cryogenic pump, an expander unit, a generator, and a driver unit, wherein:
   the compressor unit includes at least one low-pressure compressor and at least one high-pressure compressor, the compressors being connected in series or integrated into a multistage compressor, and an inlet of each of the low-pressure compressors being connected to an air intake duct;
   the expander unit includes at least one low-pressure expander and at least one high-pressure expander, the expanders being connected in series or integrated into a multistage expander, and an outlet of the low-pressure expanders being connected to an air outlet duct;
   a driving shaft of the driver unit is coupled to a driven shaft of the compressor unit and a driven shaft of the generator is coupled to a driving shaft of the expander unit;
   the at least one low-pressure compressor and the at least one high-pressure compressor are connected to the heat exchanger and storage device;
   the heat exchanger and storage device, the cold exchanger and storage device and the cryogenic tank are connected in sequence;
   the throttling valve is provided between the cold exchanger and storage device and the cryogenic tank;
   the throttling valve and the at least one cryogenic pump are located between the cryogenic tank and the cold storage and exchanger device with the throttling valve being disposed upstream to the cryogenic tank;
   the heat exchanger and storage device is connected to the at least one low-pressure expander and the at least one high-pressure expander;
   during the period of energy storage, electricity is used to drive the compressor unit and pressurize air to a supercritical air, and the compression heat is recovered and stored in the heat exchanger and storage device;
   the supercritical air is then introduced into the cold exchanger/storage device where it is cooled down to a low temperature by extracting the cold storage in the cold exchanger/storage device, and the cooled air stream then expands via the throttling valve where a vast majority of the air stream is liquefied and stored in cryogenic tank;
   during the period of energy release, liquid air is pumped into the cold exchanger and storage device where it is heated isobarically and becomes the supercritical air, and at the same time, cold energy contained by the supercritical air is extracted and stored in the cold exchanger/storage device;
   the supercritical air is further heated by using the compression heat stored in the heat exchanger/storage device;
   the heated air is expanded through the expander unit to drive the electric generator; and
   the throttling valve is further provided to throttle the pressurized air for supplying additional cold energy when cold energy is not enough; wherein, the cold air is converted into a wet vapor state by throttling, upon which saturated liquid air is the major component and the remaining saturated vapor flows back into the cold exchanger and storage device.

2. The energy storage system using supercritical air of claim 1, wherein:
   the driver unit is an electrical motor, which is driven by the electricity produced by one or more of the following utilities: fossil fueled power station, nuclear power station, and wind, solar, hydroelectric, tidal power stations.

3. The energy storage system using supercritical air of claim 1, wherein:

the energy storage operation occurs during periods of low energy demand, excessive renewable energy supply and unacceptably low quality renewable energy supply; and the energy release operation occurs during periods of high energy demand, electrical accident and wide fluctuations of renewable energy output.

4. The energy storage system using supercritical air of claim 1, wherein:

the heat exchanger and storage device is configured to communicate with other external heat sources.

5. The energy storage system using supercritical air of claim 4, wherein:

the heat exchanger and storage device stores the heat in form(s) of one or more of:
sensible heat, latent heat and chemical energy;

the heat storage media is selected from one or more of: water, paraffin, bio-oil, inorganic crystalline hydrated salts, molten salt, metals and their alloys, organic fatty acids, stone, rock and concrete, which are stored in well-insulated storage containers; wherein the heat exchanger and storage device absorbs and stores compression heat during storing energy, and heats compressed air before it enters each stage of the expander during releasing energy; and waste heat is additionally supplied to the heat exchanger and storage device during energy releasing.

6. The energy storage system using supercritical air of claim 1, wherein:

the types of compressors in the compressor unit are: reciprocating, axial, centrifugal, screw or mixed.

7. The energy storage system using supercritical air of claim 1, wherein:

the types of expanders in the expander unit are: reciprocating, axial, centripetal, screw or mixed.

8. The energy storage system using supercritical air of claim 1, wherein:

the compressor unit and the expander unit include a plurality of compressors and expanders respectively, which are mounted on a single or several shafts.

9. The energy storage system using supercritical air of claim 1, wherein:

the system further comprises: a further heat exchanger and storage device, which is communicated with a solar collectors so as to form a thermal energy generation circuit; the heat exchanger and storage device, the further heat exchanger and storage device, the low-pressure expanders and the high-pressure expanders are connected in sequence in order to form a working circuit, wherein:

supercritical air from the heat exchanger and storage device firstly flows through the further heat exchanger and storage device and is heated to a high temperature, then supplied to the high-pressure expander; and after having been expanded in the high-pressure expander to produce work, the supercritical air flows through the heat exchanger and storage device for heating, and then expands in the low-pressure expander to produce work.

10. The energy storage system using supercritical air of claim 9, wherein:

the heat exchanger and storage device stores the heat in form(s) of one or more of:
sensible heat, latent heat and chemical energy;

the heat storage media is selected from one or more of: water, paraffin, bio-oil, inorganic crystalline hydrated salts, molten salt, metals and their alloys, organic fatty acids, stone, rock and concrete, which are stored in well-insulated storage containers; wherein the heat exchanger and storage device absorbs and stores compression heat during storing energy, and heats compressed air before it enters each stage of the expander during releasing energy; and waste heat is additionally supplied to the heat exchanger and storage device during energy releasing.

11. The energy storage system using supercritical air of claim 1, wherein:

the heat exchanger and storage device stores the heat in form(s) of one or more of:
sensible heat, latent heat and chemical energy;

the heat storage media is selected from one or more of: water, paraffin, bio-oil, inorganic crystalline hydrated salts, molten salt, metals and their alloys, organic fatty acids, stone, rock and concrete, which are stored in well-insulated storage containers; wherein the heat exchanger and storage device absorbs and stores compression heat during storing energy, and heats compressed air before it enters each stage of the expander during releasing energy; and waste heat is additionally supplied to the heat exchanger and storage device during energy releasing.

12. The energy storage system using supercritical air of claim 1, wherein:

supercritical air is cooled to a temperature between 81 K and 150 K through the cold exchanger/storage device in which cold is stored in one or two forms of sensible heat and solid-liquid phase change heat;

the sensible cold storage medium may comprise one or more materials selected from:
sealed ice ball, sand, gravel, aluminum strip or other metals;

the solid-liquid phase change cold storage medium may include one or more materials selected from: ammonia, aqueous ammonia, salts water solutions, alkane, olefin and their compounds, alcohols and their water solutions, with the solid-liquid phase transition temperatures being in the range of 81K to 273K, the cold storage medium is stored in well-insulated storage containers;

in the cold exchanger and storage device, the supercritical air including the supercritical air or liquefied air exchanges heat directly or indirectly with the cold storage medium; and supercritical air is cooled in the cold exchanger and storage device during storing energy while the cold energy produced in the process of the liquid air gasification is stored in the cold exchanger and storage device during releasing energy.

13. The energy storage system using supercritical air of claim 1, wherein:

the cryogenic pump are configured to be: reciprocating, centrifugal or mixed, in which liquid air is pumped up to a pressure in the range of 3.8 MPa to 34 MPa; when multiple pumps are used, they are arranged either in series or in parallel.

14. The energy storage system using supercritical air of claim 1, wherein:

an air separation column is provided between the cold exchanger and storage device and the cryogenic tank for producing air separation products, wherein:

the cold air stream from the cold exchanger and storage device flows into the air separation column to produce air products, and the resulted gaseous products are recycled, and refined liquid ones are delivered and then stored in the cryogenic tank.

15. The energy storage system using supercritical air of claim 14, wherein:
the inlet temperature and expansion ratio of the low-pressure expander is adjustable to control the temperature of the air at the outlet such that air discharged from the low-pressure expander can be used for air conditioning and refrigeration.

16. The energy storage system using supercritical air of claim 1, wherein:
the inlet temperature and expansion ratio of the low-pressure expander is adjustable to control the temperature of the air at the outlet such that air discharged from the low-pressure expander can be used for air conditioning and refrigeration.

17. The energy storage system using supercritical air of claim 1, wherein:
during energy storing, the storage speed is controllable by adjusting intake air flow rate of the low-pressure compressor.

18. The energy storage system using supercritical air of claim 1, wherein:
during energy releasing, generation speed is controllable by adjusting the flow rate of the cryogenic pump.

19. The energy storage system using supercritical air of claim 1, wherein:
waste heat is stored in the heat exchanger and storage device and used for heating intake air of each stage of the expander unit.

20. The energy storage system using supercritical air of claim 19, wherein:
waste heat is generated from power plant, cement industry, iron and steel industry, or chemical industry.

21. The energy storage system using supercritical air of claim 1, wherein:
the types of compressors in the compressor unit are: reciprocating, axial, centrifugal, screw or mixed.

22. The energy storage system using supercritical air of claim 1, wherein:
the types of expanders in the expander unit are: reciprocating, axial, centripetal, screw or mixed.

* * * * *